United States Patent [19]

Alexander et al.

[11] Patent Number: 5,209,433
[45] Date of Patent: May 11, 1993

[54] MOBILE ROCKET SERVICE TOWER

[75] Inventors: Walter L. Alexander; James E. Dailey; John P. Porter, all of Houston, Tex.

[73] Assignee: Brown & Root U.S.A., Inc., Houston, Tex.

[21] Appl. No.: 646,249

[22] Filed: Jan. 28, 1991

[51] Int. Cl.⁵ .............................................. B64F 1/00
[52] U.S. Cl. ........................... 244/114 R; 244/158 R; 244/63; 182/63; 182/12; 182/130
[58] Field of Search .................. 244/158 R, 63, 114 R; 52/126.7; 182/222, 12, 63, 128, 130; 14/69.5, 71.1

[56] References Cited

U.S. PATENT DOCUMENTS

| | | | |
|---|---|---|---|
| 3,063,514 | 11/1962 | Hiyama | 182/63 |
| 3,256,955 | 6/1966 | Izmirian et al. | 182/130 |
| 3,305,113 | 2/1967 | Gardner | 214/83.1 |
| 3,465,846 | 9/1969 | Jacobson | 182/36 |
| 3,625,306 | 12/1971 | Sauer et al. | 182/63 |
| 3,817,347 | 6/1974 | Spencer | 182/115 |
| 3,937,301 | 2/1976 | Bertail | 182/63 |
| 4,397,373 | 8/1983 | Ream et al. | 182/17 |
| 4,657,112 | 4/1987 | Ream et al. | 182/63 |
| 4,727,959 | 3/1988 | Kummer | 182/128 |
| 4,736,812 | 4/1988 | Livneh | 180/168 |

FOREIGN PATENT DOCUMENTS 2635500 4/1989 France ............................ 244/158 R

OTHER PUBLICATIONS

Univ. of California Engineering and Physical Sciences Extension Series, Space Logistics Engineering, no date, pp. 468-471.
NASA, Space Shuttle "Enterprise" Stands on KSC. Launch Pad 39A, 1980.
Status Report for the Committee on Science and Technology U.S. House of Representatives, 95 Congress, Space Shuttle 1978, p. 351.

Primary Examiner—Joseph F. Peters, Jr.
Assistant Examiner—Anne E. Bidwell
Attorney, Agent, or Firm—Vinson & Elkins

[57] ABSTRACT

A rocket assembly apparatus is disclosed in which a vertical assembly building houses a multi-stage rocket and provides a clear work area around the entire circumference of the rocket. A mobile rocket service tower is moveable on the floor of the vertical assembly building to any desired circumferential location with respect to the rocket and has a plurality of cantilevered access platforms with curved outer edges for conforming to the shape of the rocket at various vertical and circumferential positions.

2 Claims, 2 Drawing Sheets

MOBILE ROCKET SERVICE TOWER

This invention relates to the field of rocket assembly and service apparatus and more particularly to such apparatus intended to be used in a vertical assembly building for multi-stage rockets.

Multi-stage rocket typically are assembled in large enclosures known as vertical assembly buildings. These buildings provide an environmental cover to protect the rocket components from the elements during assembly and servicing, an overhead crane for lifting the rocket sections into position for assembly and means for personnel access to the rocket sections at desired vertical and circumferential locations. In the prior art such access means typically comprised fixed platforms or scaffolding constructed on the interior of the vertical assembly building in surrounding relationship to the rocket sections and having a plurality of floors or levels interconnected by elevators or stairways. The fact that the different models of multi-stage rockets each are uniquely configured in terms of height, circumference, the points at which access hatches are available to the interior of the rockets and the like, has necessitated custom building of specific vertical assembly buildings and specific access platforms for each different type of rocket. Thus, it is not possible, for example, to assemble a Titan IV rocket in a vertical assembly building built for a different type of rocket. The principal limitation in this regard is not the overall size of the vertical assembly building itself, but rather the fixed access platforms which must be constructed for the specific characteristics of the rocket sections. Since vertical assembly buildings are very expensive structures (on the order of $500 million and more), this substantially affects the cost of each new rocket program.

It is accordingly the primary object of the present invention to provide an improved rocket assembly apparatus in which a single vertical assembly building may be utilized for assembling a wide variety of different multi-stage rockets, both existing space boosters and those planned for the future.

A further object is to provide such an apparatus in which the interior of the vertical assembly building is free of fixed access platforms or other structure around the entire circumference of the rocket and, instead, personnel access to the rocket sections is provided by means of a mobile access tower which may be positioned at any desired location around the rocket.

A further object is to provide an apparatus of modular construction so that the configuration can be changed to accommodate different configurations in space boosters.

A further object is to provide a mobile rocket service tower capable of supplying utility functions to the rocket such as electrical power, high pressure gases, air conditioning and others.

A further object is to provide such a mobile rocket service tower which will incorporate a positive lock in its operating position and will incorporate simplified interfaces with the booster vehicle.

A further object is to provide such a mobile rocket service tower which is independent and separate from the surrounding vertical assembly building so that it can remain in place after a mobile assembly building has been retired to a fall-back position.

A still further object is to provide such an apparatus in which the mobile access tower has cantilevered platforms with arcuate edges adapted to conform to various portions of the multi-stage rocket, so that at least one platform edge will conform to the rocket configuration at each desired work or access location.

These and other objects and advantages of the invention will be apparent from the following disclosure and description of the preferred embodiment of the invention and from the accompanying drawings in which like numerals indicate like parts and in which.

Figure 1:
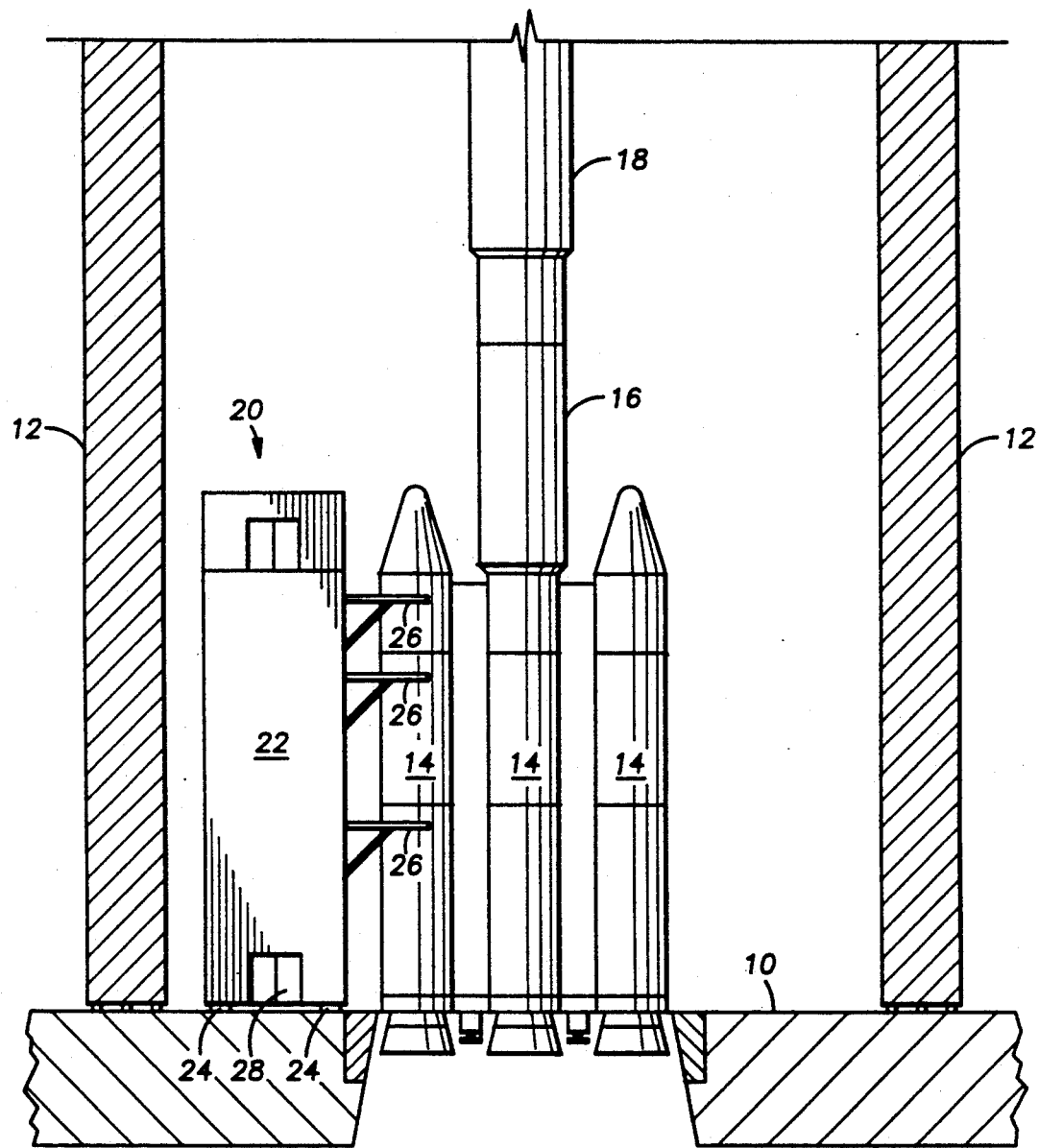
FIG. 1 is a somewhat diagrammatic illustration of the lower portion of a vertical assembly building in surrounding relationship to a multi-stage rocket and illustrating a mobile rocket service tower in accordance with the present invention.

Referring now to FIG. 1, there is illustrated the lower portion of a rocket vertical assembly building including a floor 10 and vertical wall sections 12. The walls extend to the desired height for the types of rockets to be assembled in the building and are capped by a roof. Typically, one wall of the vertical assembly building will have a large door or doors which open to admit rocket sections and to permit the entire assembled rocket to be moved out of the building and into launch position. A gantry crane (not shown) at the top of the building provides means for lifting the various rocket sections into the desired vertical positions. A multi-stage rocket is shown in the vertical assembly building comprising three first stage boosters 14 and one second stage booster 16. A third stage 18, only a portion of which is illustrated, typically will include the payload to be launched by the rocket.

The vertical assembly building in accordance with the present invention is free of any fixed access platforms or other structure adjacent to the rocket sections around their entire circumference and for the entire vertical height of the finished rocket. This provides an unobstructed work space in which a mobile rocket service tower can operate.

The mobile service tower 20 includes an elongated rigid body 22 supported on wheels 24 of movement on the floor of the vertical assembly building around the entire circumference of the multi-stage rocket. Positive locking mechanisms 23 are vertically adjustable to engage matching recesses in the floor 10 for selectively locking the tower into a desired fixed position on the floor. Appropriate locking recesses are provided in the floor at all desired positions of the mobile tower.

A flexible hose 25 extends between releasable connections on the tower and the floor to provide utility connections (electricity, air conditioning, air or other pressurized gases, etc.) to the tower. Similar flexible connections (not shown) are provided on the tower for supplying utilities to various stages of the rocket, as desired.

A plurality of cantilevered access platforms 26 provide means for personnel access to the desired vertical locations on the first stage rocket sections 14, while movement of the tower along the floor of the vertical assembly building provides access at the desired circumferential locations. An elevator 28 provides means for vertical movement through the body of the tower to the various access platforms. Interior or exterior stairs or ladders (not shown) also may provide access to the various platforms.

Figure 2:
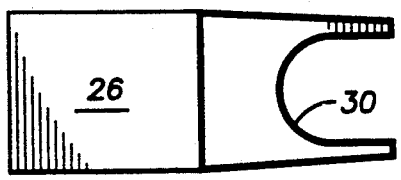
FIG. 2 is a plan illustration of one of the cantilevered access platforms on the mobile rocket tower.
Figure 3:
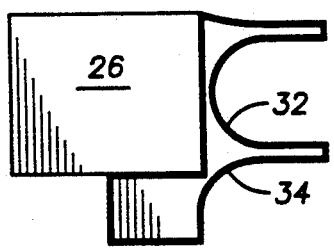
FIG. 3 is a plan illustration of an alternate embodiment of a cantilevered access platform on the tower.

As illustrated in FIG. 2, the access platforms have arcuate outer edges 30 to conform to the outside walls of the rocket sections. As illustrated in FIG. 3, a single platform may, if desired, have a plurality of curved edges of different curvatures so as to conform to different portions of the rocket surface. Thus, for some purposes, the operator of the rocket service tower might position arcuate edge 32 adjacent one portion of a rocket section and for other purposes might position arcuate edge 34 adjacent to a different portion of the rocket having a different curvature or configuration.

Figure 4:
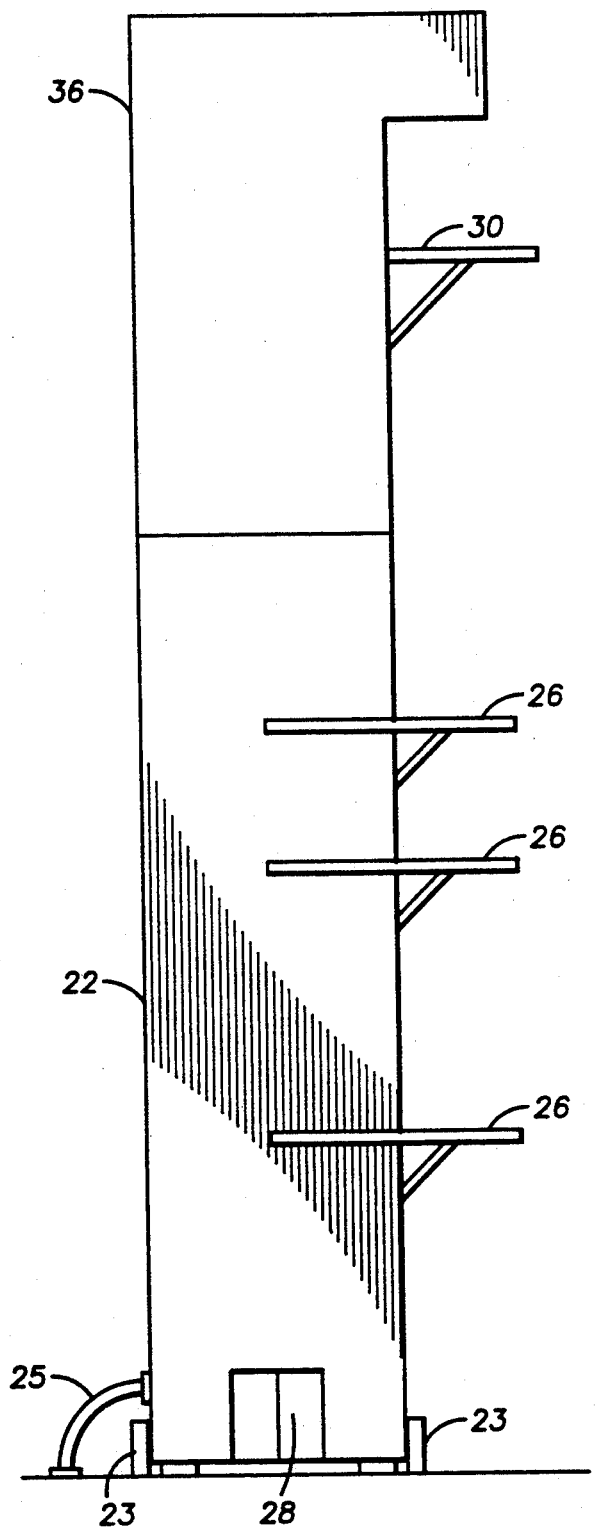
FIG. 4 illustrates an alternate embodiment of the mobile rocket service tower to which an additional upper stage has been added for servicing upper stages of the rocket.

As illustrated in FIG. 1, the mobile rocket service tower 20 is only of sufficient height to provide personnel access to the first stage rocket 14. For providing access to upper stages such as 16 and 18 it might be desired to use a different mobile service tower. Alternatively, as illustrated in FIG. 4, an additional segment or segments 36 might added to the top of the tower body 22 to provide the additional height required. The cantilevered platform 38 on upper tower segment 36 extends further out from the tower to engage the second stage rocket segment 16.

It will be appreciated that with this system a single vertical assembly building and a single mobile service tower or set of towers can be used for a large number of different rocket configurations, with specific mobile rocket service towers being used for each different rocket configuration. Alternatively, the rocket service towers could be modular in nature, so that only the access platforms 26, 38 would need to be repositioned or reconfigured for each different rocket configuration.

The foregoing disclosure and description of the invention are illustrative only and various changes in the size, shape and other details of construction may be made within the scope of the appended claims without departing from the spirit of the invention.

What is claimed is:

1. A rocket assembly apparatus comprising:
   a vertical assembly building comprising a floor, walls and a roof and adapted to house a multi-stage rocket in a vertical position,
   said vertical assembly building being free of any fixed internal structure adjacent to said rocket, so that an unobstructed work space is provided around the entire circumference of the rocket for substantially the entire vertical height of the rocket;
   a mobile rocket service tower adapted to operate in said unobstructed work space for providing personnel access to said rocket at a plurality of vertical and circumferential locations, said tower comprising,
   an elongated rigid body,
   wheels for supporting said body on the floor of said vertical assembly building for movement around the entire circumference of the rocket,
   a positive locking mechanism on said body engageable with said floor of said vertical assembly building for selectively locking said tower into a fixed position on said floor,
   a plurality of cantilevered access platforms extending outwardly from at least one side of said tower body,
   at least some of said access platforms having arcuate outer edges adapted to conform to the outer surface of said rocket at a selected vertical elevation, and
   vertical access means in said body for providing vertical access to each of said platforms,
   whereby personnel working on the rocket may have access to desired portions of the rocket by moving the tower to a desired circumferential position with respect to the rocket and accessing the rocket by means of one or more of the cantilevered access platforms.

2. The apparatus according to claim 1 wherein at least one of said access platforms has a plurality of outer arcuate edges of different curvatures, adapted to conform to different portions of said rocket.

* * * * *